United States Patent
Lockwood

[15] 3,636,921
[45] Jan. 25, 1972

[54] INVERTED WHEEL APPLICATOR

[72] Inventor: Glynn H. Lockwood, Carmel Valley, Calif.
[73] Assignee: Lockwood Technical, Inc., Sand City, Calif.
[22] Filed: June 24, 1970
[21] Appl. No.: 49,343

[52] U.S. Cl. ........................................................118/259
[51] Int. Cl. ..........................................................B05c 1/08
[58] Field of Search..................118/118, 112, 258, 259, 260, 118/261

[56] References Cited

UNITED STATES PATENTS 3,015,301  1/1962  Heinrich..............................118/259

*Primary Examiner*—Henry S. Jaudon
*Attorney*—Charlton M. Lewis

[57] ABSTRACT

When liquids such as hotmelt adhesives are applied to an upwardly facing surface by an inverted applicator wheel, liquid has tended to drip onto the work from the wheel or from the lower surfaces of the wheel housing. The present structure virtually eliminates such drippings by forming the housing with lower surfaces that incline continuously downward toward a lower termination region closely adjacent a wheel side face, the angle of inclination being sufficient that liquid adheres to the surfaces and flows downward to the termination region, from which it is transferred to the wheel. The housing is relieved where the wheel side faces reenter the housing. Liquid transferred to the wheel then is reliably carried upward and returned to the supply of available liquid in the wheel chamber. Retention of liquid in the wheel chamber is aided by novel shaping of the upper chamber walls.

6 Claims, 8 Drawing Figures

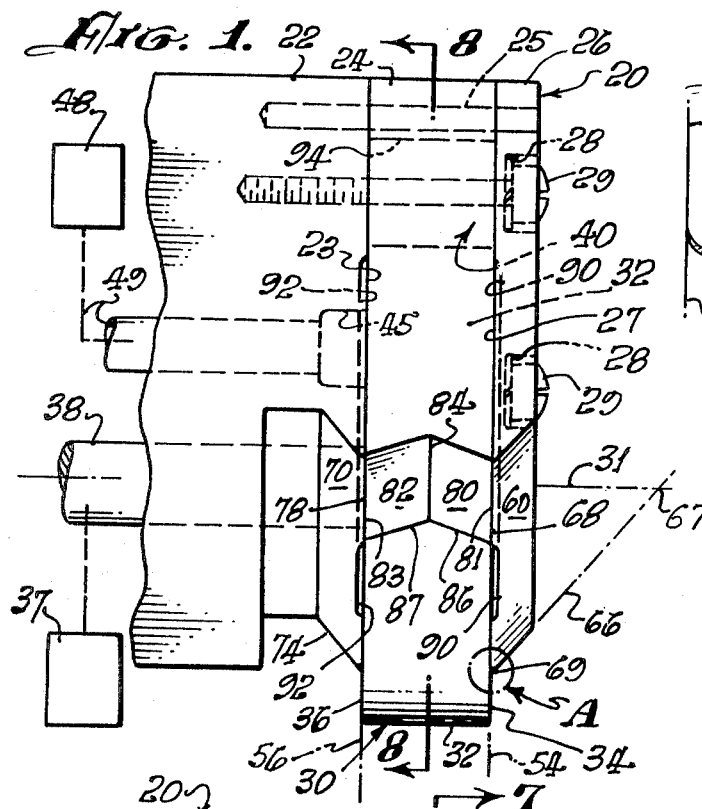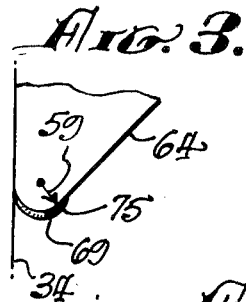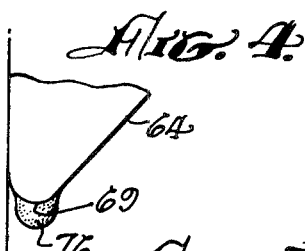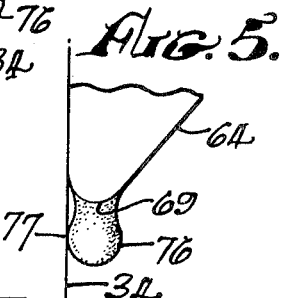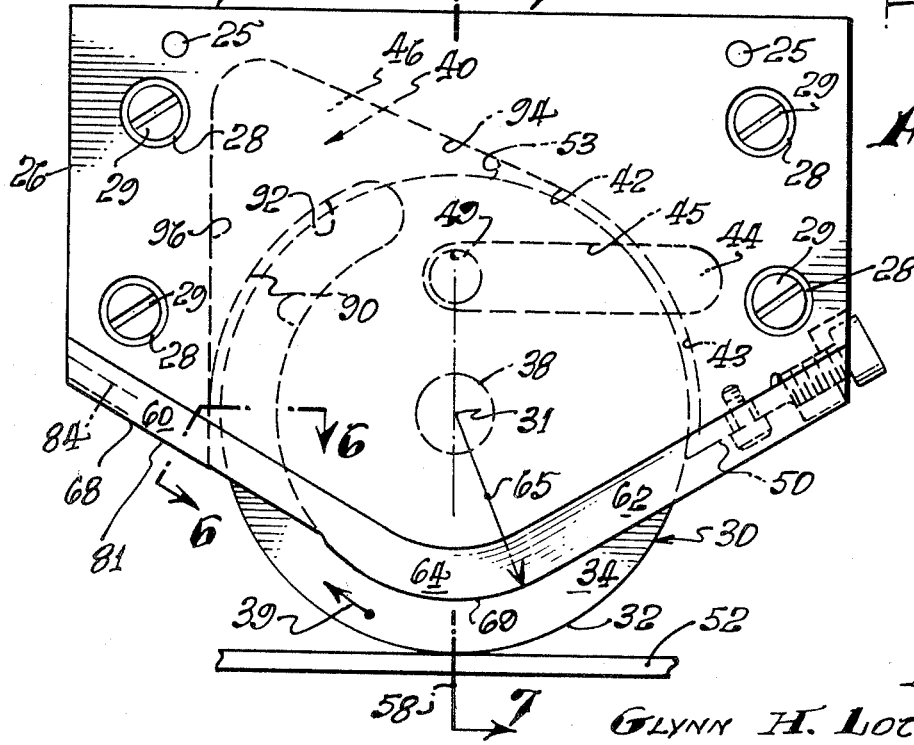

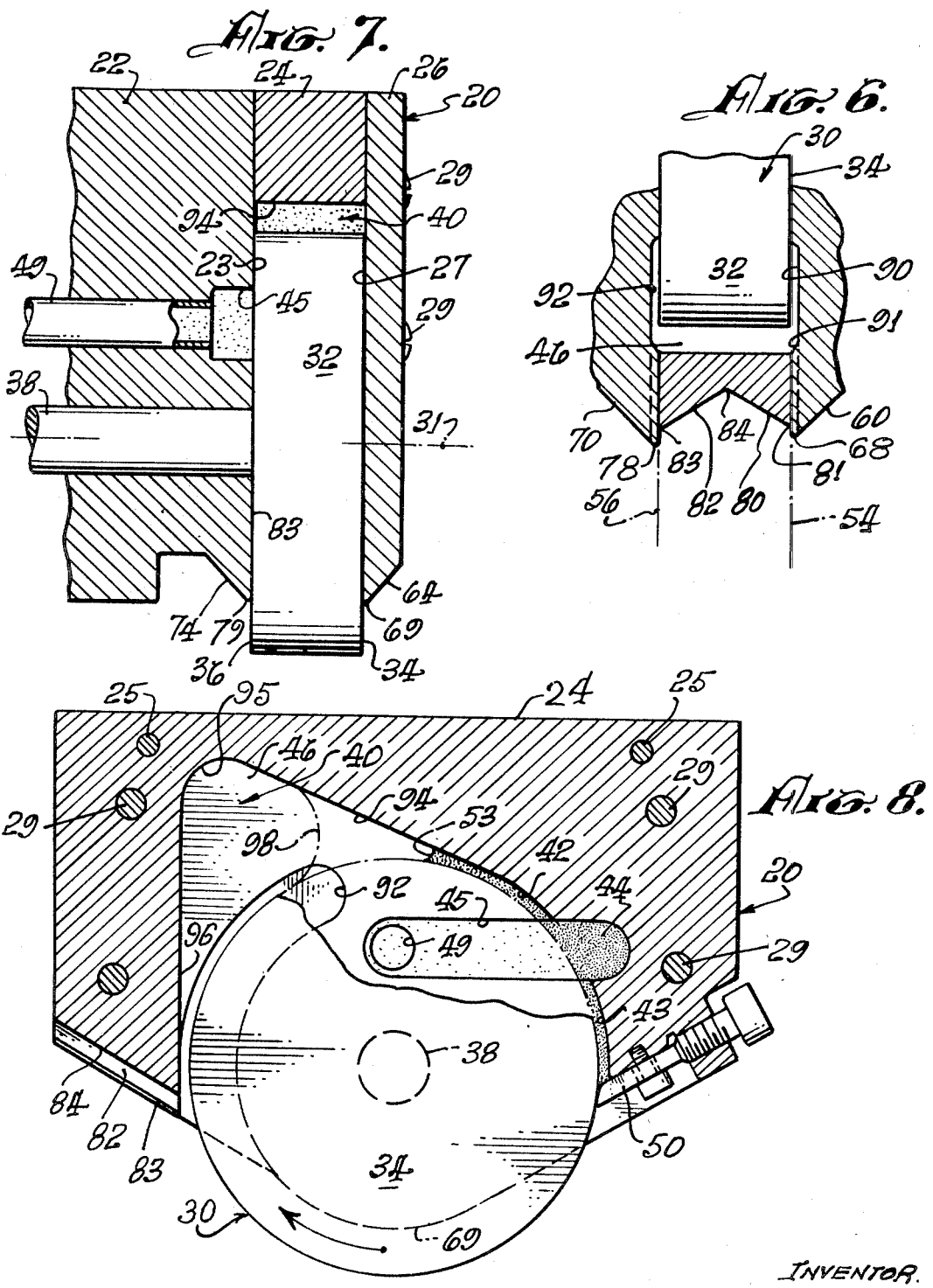

INVERTED WHEEL APPLICATOR

This invention has to do generally with wheel applicators for applying liquid to an upwardly facing work surface.

Such applicators conventionally have a cylindrical wheel surface that is partially enclosed by structure forming a wheel chamber, liquid in the chamber being metered to the wheel surface by a doctor blade or the like where the metering surface leaves the chamber. Since the lower part of the wheel metering surface must project from the chamber to engage an upwardly facing work surface, liquid tends to drip from the wheel and from the lower surfaces of its supporting structure. Although various procedures have been described for reducing the dripping from such inverted wheel applicators, they have been only partially successful.

An important object of the present invention is to provide an inverted wheel applicator that is substantially free from undesired dripping, either from the wheel itself or from the lower surfaces of the support and housing structure adjacent the wheel.

The invention accomplishes that useful objective without requiring complex control mechanism or additional moving parts, and without reducing the reliability and efficiency of the normal wheel operation.

One aspect of the invention controls any liquid that may appear on the support and housing surfaces surrounding the wheel area by forming those surfaces in such a way that such liquid is reliably deposited onto the exposed lower portion of the wheel itself. The structure is such that liquid so deposited on the wheel is carried upward into the wheel chamber and thus returned to the normal store of liquid available for application.

A further aspect of the invention provides improved configuration of the wheel chamber itself, to prevent dripping of any liquid that flows along a chamber surface outward through the open chamber mouth at which the wheel metering surface reenters the chamber. The invention provides chamber configuration such that liquid on any chamber wall is either returned directly to the normal liquid store in the chamber, or, if it flows out through the chamber mouth, is deposited reliably on an external wheel surface and returned thereby to the interior of the chamber.

The invention is particularly but not exclusively useful in connection with applicators for liquids of appreciable viscosity, such as hotmelt adhesives, for example, and will be described for the sake of clarity with special reference to such liquids.

A full understanding of the invention, and of its further objects and advantages, will be had from the following description of preferred structure for carrying it out. The particulars of that description, and of the accompanying drawings which form a part of it, are intended only as illustration and not as a limitation upon the scope of the invention.

In the drawings:

FIG. 1 is a side elevation representing a preferred embodiment of the invention;

FIG. 2 is an end elevation,

FIGS. 3, 4 and 5 are details at enlarged scale, corresponding to region A of FIG. 1 and representing successive stages of drop formation;

FIG. 6 is a fragmentary section at enlarged scale on line 6—6 of FIG. 2;

FIG. 7 is a section on line 7—7 of FIG. 2; and

FIG. 8 is a section on line 8—8 of FIG. 1.

The present drawings represent an illustrative inverted wheel applicator embodying the invention. The housing and support structure 20 includes the main support block 22, the spacer plate 24, which is recessed to receive the applicator wheel 30, and the faceplate 26. Applicator wheel 30 is mounted on the shaft 38, which is journaled on block 22 on the axis 31 and is driven by means indicated schematically at 37 in a normal operating direction, indicated by the arrow 39 in FIG. 2. The wheel has a generally cylindrical metering surface 32, bounded axially by the outer and inner side faces 34 and 36, respectively, which are perpendicular to axis 31. The thickness of spacer plate 24 is such that the wheel can just turn freely between the outer face 23 of block 22 and the inner face 27 of faceplate 26. Temperature expansion is preferably compensated, as by mounting faceplate 26 with slight freedom for axial movement. The radial position of the plate is typically defined accurately by the dowel pins 25, while the springs 28 under the heads of screws 29 press the plate firmly toward spacer plate 24. For the application of hotmelt adhesives, the housing and other components are heated to a controlled temperature by conventional means, not explicitly shown.

The wheel chamber 40, which is formed primarily as a recess in spacer plate 24, includes the upper and lower generally annular portions 42 and 43, the inlet and storage portion 44, and the entrance portion 46 (FIG. 8). Liquid to be applied to the moving work surface 52 is supplied to the wheel chamber in proper amount to maintain storage chamber 44 normally filled with liquid and upper annular chamber 42 partially filled. The liquid surface may vary over an appreciable range, having a normal position such as that indicated at 53. Liquid may be supplied by mechanism of any suitable type, indicated schematically at 48 with inlet conduit structure in block 22 indicated at 49. That conduit may, for example, communicate with storage chamber 44 via a chamber extension 45, formed as a recess in face 23 of block 22. The doctor blade 50, which is typically of conventional construction, is mounted on spacer plate 24 at the lower end of annular chamber 43, and meters liquid in normal manner from the wheel chamber onto wheel metering surface 32 as it leaves the chamber.

In accordance with one aspect of the invention, the lower surfaces of the housing and support structure adjacent the wheel are inclined downward toward the vertical axial plane 58 (FIG. 2) and toward one or other of the outer and inner face planes 54 and 56 (FIG. 1). The latter planes substantially coincide with the outer and inner wheel side faces 34 and 36. In the present housing structure the face planes are typically the planes of contact between the primary housing members 22, 24 and 26. The portion of the housing outward of outer face plane 54, that is, faceplate 26 in the present structure, has lower surfaces inclined toward that face plane and toward axial plane 58. As shown, those lower surfaces comprise the two flat surface areas 60 and 62, which are disposed symmetrically with respect to axial plane 58, and the conically curved surface area 64, to which areas 60 and 62 are tangent. Conical area 64 is a portion of a cone coaxial with wheel axis 31 and formed by the generating line 66 which intersects axis 31 at the cone apex 67 outward of the housing structure (FIG. 1). The three surface areas 60, 62 and 64 form with the inner face 27 of faceplate 26 a continuous edge 68, which is inclined downward toward axial plane 58. Near that plane, edge 68 is circularly curved coaxially about wheel axis 31 with the radius 65 (FIG. 2). The curve thus becomes horizontal as it intersects that plane. The edge region near plane 58 forms the lowermost termination 69 of the described system of inclined surfaces, toward which liquid is delivered.

The lower surfaces of housing 20 inward of inner face plane 56 and adjacent that plane are inclined toward that plane and toward axial plane 58. As illustrated, those surfaces have shapes essentially identical with those of faceplate 26, just described, comprising the flat surface areas 70 (FIGS. 1 and 6) and 72 (not shown), symmetrically placed with respect to axial plane 58, and the conically curved area 74 to which they are tangent. Those surface areas form with blockface 23 the inclined edge 78, with a lowermost termination 79 similar to that of edge 68, already described. The inclined surfaces 70, 72 and 74 preferably extend axially inward from face plane 56 as far as liquid is likely to occur on the external housing surface. In practice, such liquid is normally confined to the immediate vicinity of the wheel, and the surface width shown illustratively in FIG. 1, corresponding generally to that of faceplate surfaces 60, 62 and 64, is ordinarily sufficient.

The lower surfaces of housing 20 between face planes 54 and 56 comprising in the present structure the lower surfaces of spacing plate 24, are also preferably inclined in the manner described, at least on the side of the wheel opposite to doctor blade 50. As illustrated, the two flat surfaces 80 and 82 are similarly inclined toward axial plane 58 and are oppositely inclined toward the respective face planes 54 and 56, thus forming the inverted and inclined dihedral angle with vertex at 84. The faces 80 and 82 form with the respective flat side faces of spacer plate 24 the inclined edges 81 and 83. Those edges are typically parallel to the corresponding portions of the respective edges 68 and 78, already described, and may be essentially coincident with, or somewhat higher than those edges.

As seen in FIGS. 1 and 6, the lower surfaces of spacer plate 24 are essentially symmetrical with respect to the midplane of the plate. However, for some purposes it may be desirable to shift the vertex 84 of the dihedral angle formed by faces 80 and 82 toward one or other of the face planes 54 and 56, for example to accommodate a difference of level between the inclined surfaces of faceplate 26 and those on main block 22. In fact, vertex 84 may be shifted all the way to one face of the spacer plate, so that either surface 80 or 82 disappears and the other surface extends the full axial width of the spacer plate.

In operation of the applicator, as so far described, any liquid on the upper surfaces of faceplate 26 flows slowly downward, at a rate limited by the typically high viscosity of the liquid, onto inclined lower surface 60, 62 or 64. The inclination of those surfaces is such that liquid reaching them does not drip from them, but adheres under control of surface tension and flows downward along the inclined surface to edge 68. Liquid appearing at inclined portions of that edge similarly is retained on it by surface tension and flows downward along the edge toward axial plane 58. As such liquid reaches the wheel periphery it tends to be transferred to the wheel. Similar action takes place when liquid flows down the sides of housing block 22 and reaches inclined lower surface 70 or 72, such liquid flowing along edge 78 to the wheel periphery. Also, liquid flowing down the side of spacer plate 24 to inclined surface 80 or 82 is directed from those surfaces to edge 81 or 83 and thence to edge 68 or 78, joining the liquid already described as flowing along those edges to the wheel periphery.

Inner face 27 of faceplate 26 and outer face 23 of housing block 22 are relieved where the peripheral portions of wheel side faces 34 and 36 enter wheel chamber 40, as indicated at 90 and 92, respectively. That relief insures that any liquid on a wheel side face will not be wiped off as the wheel reenters the housing. The depth of the relief in an axial direction is exaggerated in the drawings for clarity of illustration, but is preferably only slightly greater than the thickness of liquid produced on the wheel side face after a drop is deposited on it. That thickness varies with the liquid used, but is typically only one or two hundredths of an inch. With a channel depth of that order, liquid entering the channel is strongly carried along with the wheel by viscous action. The relief channels preferably extend circumferentially for at least 20° to 40° about axis 31, allowing ample opportunity for liquid to flow radially out of the channels into entrance portion 46 of wheel chamber 40.

Relief channels 90 and 92 at their lower ends cut into the inclined external surfaces 60 and 70, causing the main flow conducting edges 68 and 78 to be slightly offset away from the wheel. Liquid flowing downward along those edges therefore tends to be carried around the corner of the wheel and deposited on wheel side faces 34 and 36, rather than on the wheel corners, which might cause an excessive concentration of liquid. Any sharp corner at the start of that offset, from which liquid might drip, is removed by suitable beveling, or the entire outer boundary of each scroll channel may be beveled, as indicated at 91 in FIG. 6.

Below the relief channels 90 and 92, housing edges 68 and 78 may be sharp and closely adjacent the wheel side faces. Liquid flowing along the edges then tends to be deposited against the wheel side face without flowing any appreciable distance along the curved edge portions. Alternatively, the liquid conducting edges may be rounded in transverse section, effectively continuing an offset from the wheel side face similar to that caused by the relief channels. Although the lowest part of the edge is then spaced from the wheel side face, if such spacing is not too great the liquid is still transferred reliably to the wheel. More particularly, the radius of curvature 59 of the rounded edge is made less than the horizontal radius of a drop as it falls free from the edge. As liquid approaches the edge termination region near axial plane 58, it appears first as a film, as at 75 in FIG. 3, then accumulates to form a drop, as at 76 in FIG. 4. However, with the edge dimension just described, before the drop falls free of the edge its side face touches wheel face 34, as at 77 in FIG. 5, causing the drop to transfer essentially completely to that face. The radius 65 of edge 68 is made smaller than the wheel radius by a sufficient differential to provide adequate area of the wheel side face to receive such drops of liquid from the edge termination region. Liquid so deposited onto the wheel side face quickly spreads over the face to a thickness that will enter the clearance passages 90 and 92, and so be returned to the storage pool in chamber 40.

In accordance with a further aspect of the invention, entrance portion 46 of wheel chamber 40 is enlarged upwardly and is formed in the general manner shown best in FIG. 8. The chamber wall opposing the wheel metering surface comprises the upper inclined wall portion 94, the generally vertical side portion 96, and the relatively short curved corner portion 95. Upper wall portion 94 is inclined downwardly toward the wheel and toward annular chamber portion 42, becoming tangent to the wall of the latter. That wall configuration is useful when excess liquid accumulates in the chamber for any reason and causes the liquid body to expand, for example to such a boundary as is indicated at 98, wetting an appreciable portion of upper wall 94. When such excess liquid is again reduced to normal, whether by more rapid application of liquid to the work or by reduced delivery from the supply system 48, all of the liquid on wall portion 94 flows back into annular chamber portion 42, due to combined action of the inclined wall surface and the rotating wheel. Any small quantity of liquid appearing on vertical wall 96 can flow as a film down that wall, and is then delivered laterally by edges 86 and 87 to the liquid-handling system already described.

I claim:

1. An applicator for applying a viscous liquid to an upwardly facing work surface, said applicator including body structure, an applicator wheel journaled on the body structure on a generally horizontal axis defining a vertical axial plane, the wheel having a cylindrical metering surface and a wheel side face perpendicular to the axis, the body structure and wheel forming a wheel chamber from which the wheel projects downwardly for engaging the work surface, means for driving the wheel in a forward direction, means for supplying liquid to the chamber, and a doctor device for metering liquid to the metering surface as it leaves the chamber; said applicator being further characterized in that the body structure has exterior lower surfaces that are inclined continuously downwardly to a termination region below the axis and close to the wheel side face, the angle of said inclination being such that liquid draining from above adheres and flows downward along the surfaces to said termination region and thence to the wheel side face, whereby such liquid is carried by the wheel to the wheel chamber.

2. An applicator as defined in claim 1, and in which said inclined surface termination region includes a drip-locating edge region adjacent said axial plane and closer to the wheel side face than the radius of a drop of the liquid falling from the edge.

3. An applicator as defined in claim 1, and in which said inclined surface termination region includes an arcuate edge below and essentially coaxial with the wheel axis, the lowest portion of the edge being closer to the wheel side face than the radius of a drop of the liquid falling from the edge, and the body structure is relieved where the wheel side face reenters the chamber, said relief extending radially at least approximately from the radius of said arcuate edge outward beyond the wheel periphery.

4. An applicator as defined in claim 1, and in which said wheel chamber includes a liquid storage portion normally containing liquid and communicating with the wheel metering surface above the doctor device and below the top of the wheel, and an entrance portion normally empty of liquid on the side of the wheel opposite to the doctor device, said entrance portion having a generally vertical internal sidewall facing the wheel metering surface in spaced relation thereto and an internal top wall that is inclined continuously downward from adjacent the vertical wall to the chamber storage portion, at an angle of inclination such that liquid on the inclined wall adheres and flows downward along the wall, whereby liquid on the inclined wall of the entrance portion is returned to the chamber storage portion.

5. An applicator as defined in claim 1, and in which said body structure includes a support block having an outer, generally plane surface, a faceplate having an inner, generally plane surface, and a spacer plate interposed between said surfaces of the support block and the faceplate and recessed to receive the wheel and to form at least a major portion of the wheel chamber, the doctor device being mounted on the spacer plate at one side of the wheel, the faceplate terminating downwardly in a generally conical surface portion coaxial with the wheel and in two generally flat surface portions tangent to the conical surface portion on opposite sides of the wheel axis, the conical surface being inclined downwardly toward the plane of the faceplate surface and the flat surfaces being inclined downwardly toward the plane of the faceplate surface and toward said axial plane.

6. An applicator as defined in claim 5, and in which the downward termination of the spacer plate on the side of the wheel opposite the doctor device includes a generally flat surface inclined downwardly toward the plane of the faceplate surface and toward said axial plane.

* * * * *